United States Patent
Buske et al.

(10) Patent No.: US 6,798,614 B2
(45) Date of Patent: Sep. 28, 2004

(54) RELEASABLE DISC CLAMPING ASSEMBLY

(75) Inventors: Lon Richard Buske, Apple Valley, MN (US); Rodney Dale Dahlenburg, Minneapolis, MN (US); Joel Daniel Phillips, Burnsville, MN (US); Mark August Toffle, St. Louis Park, MN (US); Brent Melvin Weichelt, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 197 days.

(21) Appl. No.: 10/040,227

(22) Filed: Jan. 2, 2002

(65) Prior Publication Data

US 2002/0181150 A1 Dec. 5, 2002

Related U.S. Application Data

(60) Provisional application No. 60/295,275, filed on Jun. 1, 2001.

(51) Int. Cl.[7] ............................................... G11B 17/02
(52) U.S. Cl. .................................. 360/99.12; 360/98.08
(58) Field of Search ........................... 360/99.05, 99.12, 360/98.08

(56) References Cited

U.S. PATENT DOCUMENTS

| | | |
|---|---|---|
| 5,485,328 A | 1/1996 | Radwan et al. |
| 5,486,962 A | 1/1996 | Boutaghou |
| 5,497,281 A | 3/1996 | Jewell et al. |
| 5,504,638 A | 4/1996 | Kinoshita et al. |
| 5,528,434 A | 6/1996 | Bronshvatch et al. |
| 5,615,067 A | 3/1997 | Jabbari et al. |
| 5,663,851 A | 9/1997 | Jeong et al. |
| 5,751,688 A | 5/1998 | Mizuno et al. |
| 5,757,583 A | 5/1998 | Ogawa et al. |
| 5,774,445 A | 6/1998 | Sawi et al. |
| 5,801,901 A | 9/1998 | Bryan et al. |
| 5,872,681 A | 2/1999 | Boutaghou |
| 5,880,906 A | 3/1999 | Lindrose |
| 5,912,784 A | 6/1999 | Bronshvatch et al. |
| 5,923,498 A | 7/1999 | Moir et al. |
| 5,982,581 A | 11/1999 | Kazmierczak et al. |
| 6,105,240 A * | 8/2000 | Chuang et al. ........... 360/98.08 |
| 6,205,113 B1 | 3/2001 | Fahey et al. |
| 6,267,419 B1 | 7/2001 | Baker et al. |
| 6,484,575 B2 * | 11/2002 | Horning et al. ........... 360/98.08 |
| 6,578,257 B1 * | 6/2003 | Wang ....................... 360/99.12 |
| 6,600,628 B2 * | 7/2003 | Kilmer ...................... 360/99.12 |

* cited by examiner

Primary Examiner—Robert S. Tupper
(74) Attorney, Agent, or Firm—Fellers, Snider, et al.

(57) ABSTRACT

A disc positioning system for releasably securing a disc stack array on a spindle hub in a multi-disc writer system. The system includes a disc clamp with an axial catch and a retaining arrangement for engaging the catch. The retaining arrangement includes at least one radially movable member that engages and secures the axial catch in an engagement position and disengages the axial catch in a disengagement position.

22 Claims, 5 Drawing Sheets

RELEASABLE DISC CLAMPING ASSEMBLY

RELATED APPLICATIONS

This application claims the benefit of priority of U.S. provisional application Ser. No. 60/295,275, filed Jun. 1, 2001.

FIELD OF THE INVENTION

This invention relates generally to the field of digital data storage devices, and more particularly, but not by way of limitation, to a new system for holding discs in a multi-disc writing system.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 15,000 RPM or more.

Data are recorded to and retrieved from the discs by an array of aligned read/write head assemblies, or heads, which are controllably moved across disc surfaces from track to track by a common actuator assembly. Each of the read/write heads typically consists of an electromagnetic transducer carried on an air bearing slider. This slider acts in a cooperative aerodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures, which are in turn attached to arms of a rotary actuator.

The actuator assembly used to move the heads from track to track has assumed many forms historically, with most disc drives of the current generation incorporating an actuator of the type referred to as a rotary voice coil actuator. A typical rotary voice coil actuator typically has a pivot shaft fixedly attached to the disc drive housing base member closely adjacent the outer diameter of the discs. The pivot shaft is mounted such that its central axis is normal to the plane of rotation of the discs. An actuator bearing housing or "E block" is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of aligned, radially extending actuator mounting arms, to which the head suspensions mentioned above are mounted. When controlled DC current is applied to the coil, a magnetic field is formed surrounding the coil which interacts with the magnetic field of the permanent magnets to rotate the actuator bearing housing or "E block", with the attached head suspensions and head assemblies. As the actuator bearing housing rotates, the heads are moved across the data tracks along an arcuate path approximating a radial movement between the disc inner and outer diameters.

Disc drives of the current generation are included in desk-top computer systems for office and home environments, as well as in laptop computers which, because of their portability, can be used wherever they can be transported. Because of this wide range of operating environments, the computer systems, as well as the disc drives incorporated in them, must be capable of reliable operation over a wide range of ambient temperatures. Furthermore, laptop computers in particular can be expected to be subjected to large amounts of mechanical shock as they are moved about. It is common in the industry, therefore, that disc drives be specified to operate over ambient temperature ranges of from, for instance, −5 degrees Celsius to 60 degrees Celsius, and further be specified to be capable of withstanding operating mechanical shocks of 100 G or greater without becoming inoperable.

One of the areas of disc drive design which is of particular concern when considering ambient temperature variations and mechanical shock resistance is the system used to mount and clamp the discs to the spindle motor. During manufacture, the discs are typically mounted and clamped to the spindle motor in a temperature- and cleanliness-controlled environment. Once mechanical assembly of the disc drive is completed, special servo-writers are typically used to record servo information on the discs. This servo information is used during operation of the disc drive to control the positioning of the actuator used to move the read/write heads to the desired data location in a manner well known in the industry. Once the servo information has been recorded on the discs, it is assumed by the servo logic that the servo information, and all data subsequently recorded, are on circular tracks that are concentric with relation to the spin axis of the spindle motor. The discs, therefore, must be mounted and clamped to the spindle motor in a manner that prevents shifting of the discs relative to the spindle motor due to differential thermal expansion of the discs and motor components over the specified temperature range, or due to mechanical shock applied to the host computer system.

Disc stacks are also becoming used in servo writing operations where discs are written with servo data on a multiple disc writer spindle assembly and then placed onto the spindle motor. To increase throughput from such servo writing operations, the number of discs placed on a disc stack is increasing. Also, as data density on the discs increases, more precise control of the disc stack during data writing operations is desired. There is a need for a method and device to securely position the stack of discs to the spindle assembly in the servo writer. The present invention, described below, provides a solution to this and other problems, and offers other advantages over the prior art.

SUMMARY OF THE INVENTION

Against this backdrop the present invention has been developed. Embodiments of the present invention generally relate to a disc clamp arrangement including a disc clamp having an axial catch for securing an information storage disc on a spindle hub in a disc drive. The disc clamping arrangement also preferably includes retaining means for removably securing the disc clamp to the spindle hub.

Preferred embodiments of the present invention are directed to a disc clamping system for a disc stack array on a spindle hub. The disc clamping system includes a disc clamp having an axial catch and further includes a retaining arrangement for engaging the axial catch. The retaining arrangement includes at least one radially movable member that engages and secures the axial catch in an engagement position and disengages the axial catch in a disengagement position. "Radially movable" refers herein to any element in an assembly that has a range of motion enabling it to move closer to or farther from the array's axis of rotation. The movement need not be precisely along a single radius.

Other preferred embodiments of the present invention are directed to a releasable, rotatable disc positioning system. The disc positioning system includes a spindle hub and a disc stack on the spindle hub and the disc stack further includes at least one disc. The disc positioning system further includes a disc clamp including an axial catch. The disc positioning system further includes a retaining arrangement for engaging the axial catch, wherein the retaining arrangement includes a plurality of radially movable members that engage and secure the axial catch in an engagement position and disengage the axial catch in a disengagement position.

Other preferred embodiments contemplate a clamping system for clamping an object to a supporting surface with a clamping force that is directed along a clamping force axis. The clamping system comprises a clamp moveable along the clamping force axis. The clamping system comprises a catch defining an abutment surface that is noncoplanar with the clamping force axis. The clamping system further comprises a retaining assembly comprising a retaining member that is moveable in a first direction transverse to the clamping force axis to engage against the abutment surface, and is moveable in a second direction along the clamping force axis to impart the clamping force against the abutment surface in a clamped position of the clamping assembly.

Other preferred embodiments contemplate a disc stack clamping assembly comprising a hub adapted to support the disc stack having one or more discs. The disc stack clamping assembly further comprises a disc clamp insertable axially in the hub, the disc clamp comprising a catch defining a nonaxial abutment surface. A retaining assembly is supported by the hub comprising a retaining member that is moveable radially to engage against the abutment surface and moveable axially to impart an axial force against the abutment surface in clamping the clamp against the disc stack.

These and various other features as well as advantages which characterize the present invention will be apparent from a reading of the following detailed description and a review of the associated drawings.

DETAILED DESCRIPTION

Figure 1:
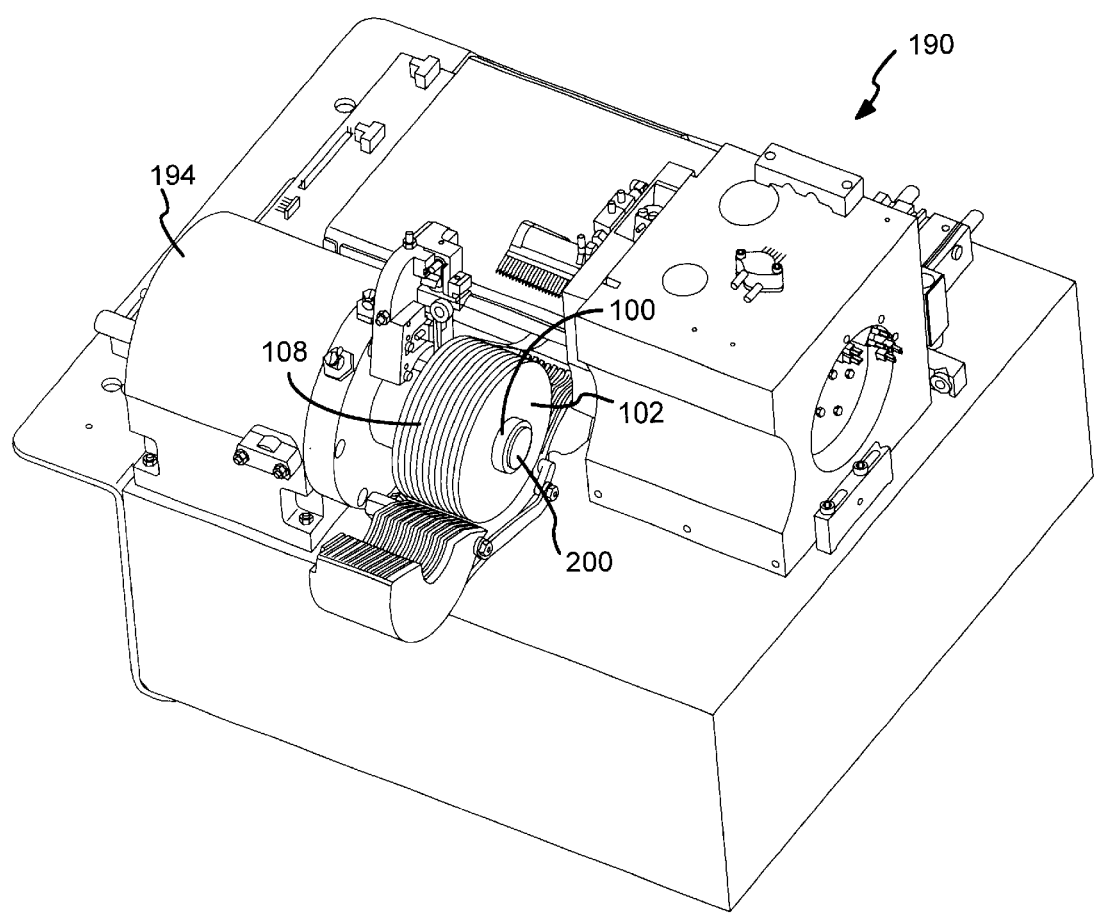
FIG. 1 is a perspective view of a multi-disc writer incorporating a preferred embodiment of the present invention showing the primary components.

Referring now to FIG. 1, shown is a multi-disc writer 190 incorporating an example embodiment of a disc clamping assembly 100 of the present invention. The multi-disc writer 190 is used to write a multi-disc stack 108 including a plurality of discs 102. The disc stack 108 is mounted on a motor spindle assembly 116 (see FIG. 2) and the spindle assembly 116 is rotated at high speed by a spin motor 194. The disc stack 108 is securely clamped to the spindle assembly 116 using a clamp 200 in accordance with an embodiment of the present invention. The disc stack 108 can be removed and mounted to the multi-disc writer 190 as an assembly.

The spindle assembly 116 can be removably secured into the motor 194. Preferably, a vacuum chuck mechanism (not shown) in the motor 194 receives a depending finger 198 (FIG. 2) of the spindle assembly 116. The chuck mechanism secures the spindle depending finger 198 such that the disc stack 108 rotates when the motor 194 is in operation.

Figure 2:
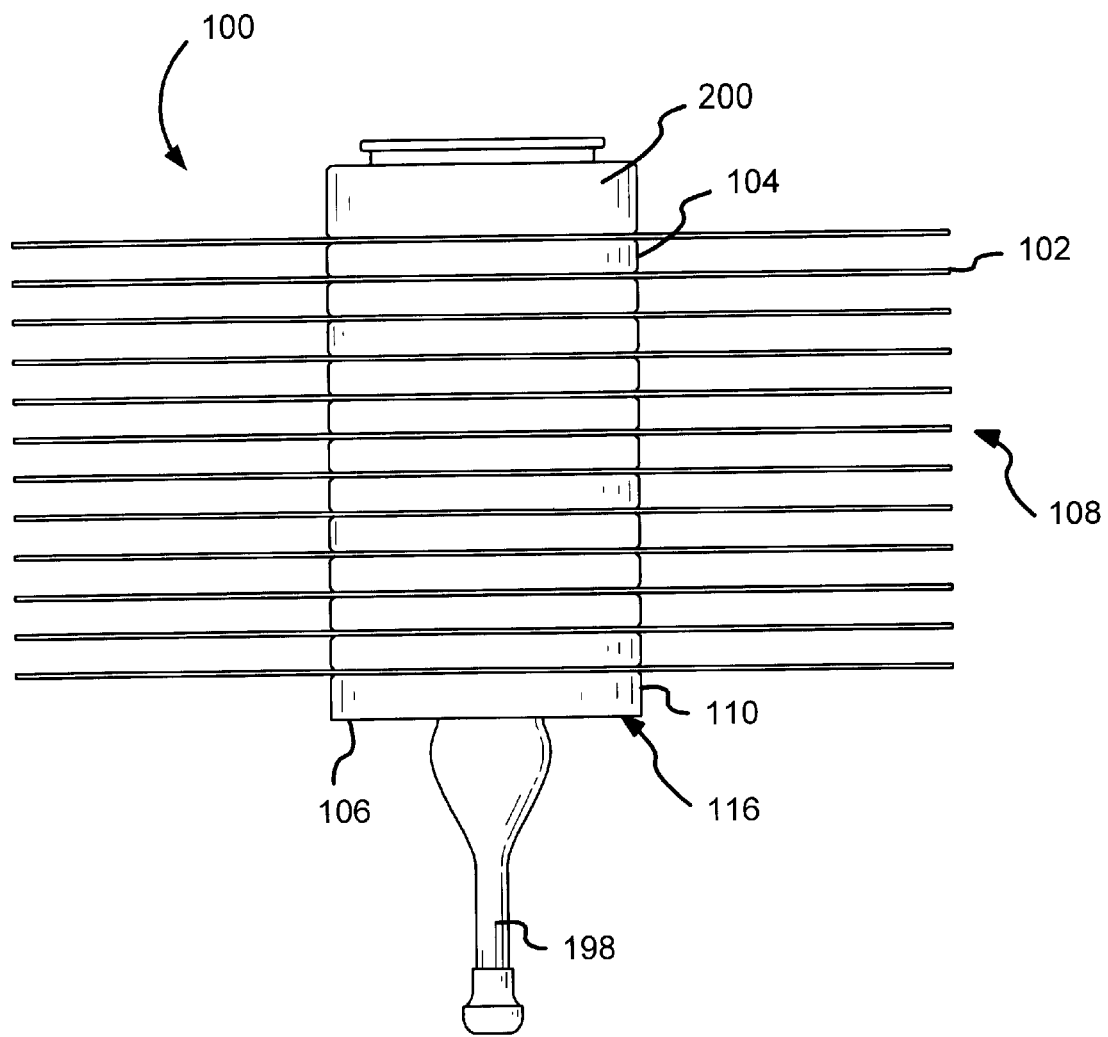
FIG. 2 is a separate side view of a spindle hub assembly with a disc stack clamped in accordance with an exemplary embodiment of the present invention.

An example embodiment of a disc clamping assembly 100 of the present invention is shown in FIG. 2. The disc clamping assembly 100 secures a disc stack 108, including a plurality of alternating discs 102 and spacers 104, to a hub 106 of the spindle assembly 116. A first disc 102 is placed on a hub flange 110 of the hub 106 and then alternating spacers 104 and discs 102 are added to complete the disc stack 108. The disc stack 108 is secured to the hub 106 of the spindle assembly 116 using a clamp 200 in accordance with an embodiment of the present invention.

Figure 3:
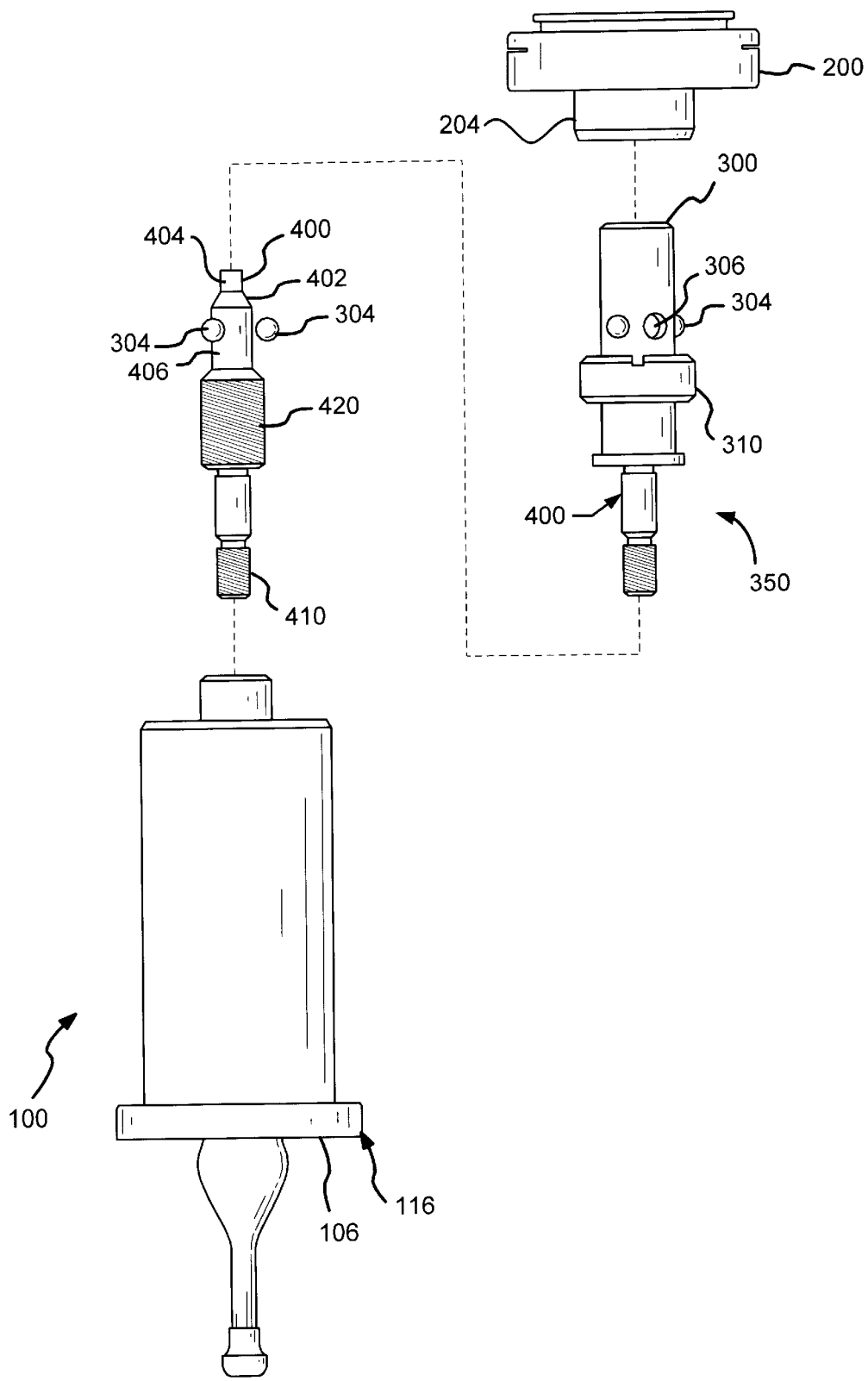
FIG. 3 is an exploded view of a clamp assembly in accordance with a preferred embodiment of the present invention.

An exploded view of an exemplary embodiment of a disc clamping assembly 100 is shown in FIG. 3. The disc clamping assembly 100 includes a spindle hub assembly 116 and a clamp 200. The hub assembly 116 includes a retaining arrangement 350 including a screw 400 a nut 300, a stop 310, and one or more radially moveable axial members, in this example, balls 304. The hub 106 receives the screw 400 and the screw 400 is secured into the hub 106, as described below. The screw 400 includes a first threaded section 410, a second threaded section 420 and a cam surface 402 between a first cylindrical surface 406 and a reduced diameter second cylindrical surface 404. The nut 300 includes openings or ports 306, which are preferably spaced equidistantly around the circumference of the nut 300 for balancing purposes.

Figure 4:
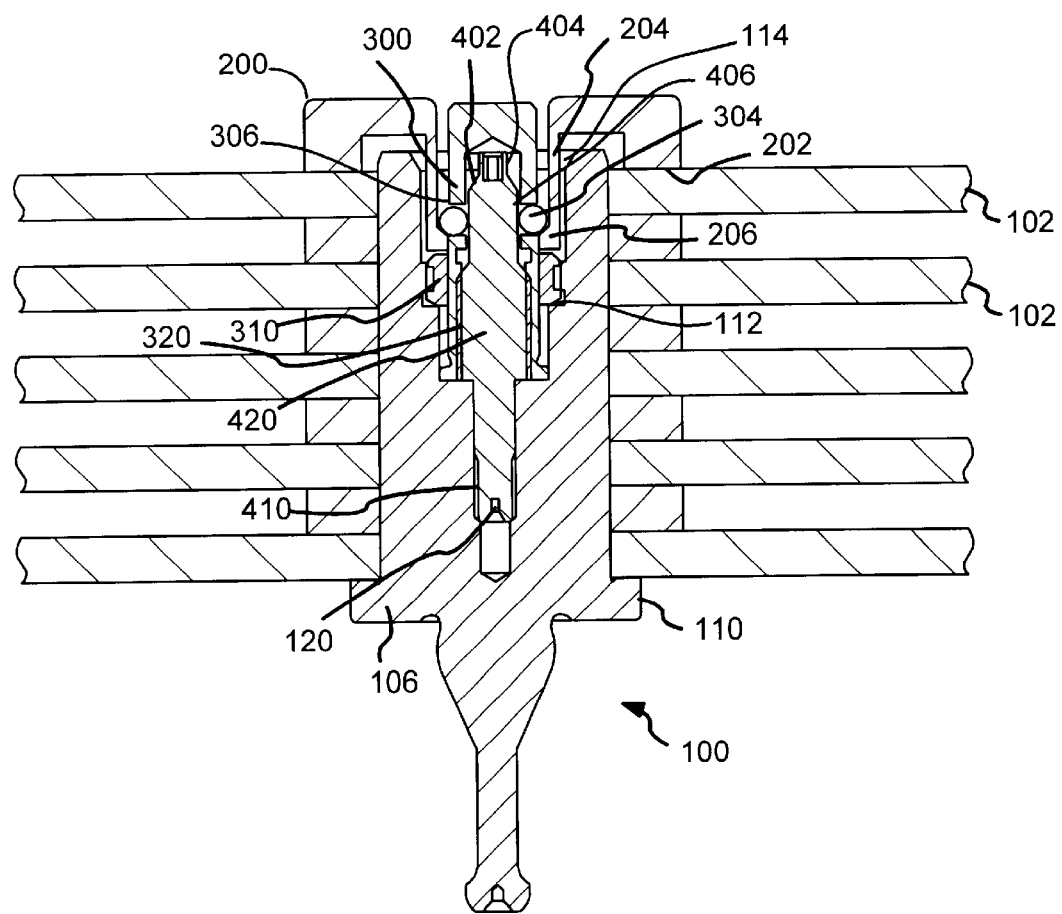
FIG. 4 is an axial cross-sectional view of a disc clamping assembly in accordance with preferred embodiments of the present invention.

Referring to FIG. 4, shown is a cross-sectional view of the disc clamp assembly 100 of FIG. 3 with the disc stack 108 removably secured between the clamp 200 and the hub flange 110. The first threaded section 410 of screw 400 (FIG. 3) is threadably engaged into a screw receiving section 120 of the hub 106. An internal first threaded section 320 of the nut 300 is threadably engaged to the external second threaded section 420 of the screw 400 (FIG. 3). The nut 300 optionally includes a stop 310 that engages an internal shoulder 112 of the hub 106. Radially moveable members, in this example embodiment, one or more balls 304, are housed between the nut 300 and the screw 400 (FIG. 3). The balls 304 are shown protruding from ports 306. The ports 306 are sized such that the balls 304 can protrude, but not pass through. This is accomplished by ensuring that the balls 304 have a diameter greater than the greatest diameter of the respective port 306 within which the ball 304 is housed. In the embodiment shown, the nut 300 includes six ports 306 spaced around the nut 300 at sixty-degree intervals. Preferably, the balls 304 are housed in alternating ports 306. Preferably, ports 306 and balls 304 are spaced equidistantly to allow the spindle hub assembly 116 (FIG. 2) to be balanced when the disc clamp assembly 100 containing the disc stack 108 is rotating.

To secure clamp 200 to hub 106, a guide portion 204 of the clamp 200 is inserted into the opening 114 of the hub 106. In the exemplary embodiment shown, the guide portion 204 is a circumferentially depending cylindrical tube having a flange defining an axial catch 206. The balls 304 retain the clamp 200 by engaging the axial catch 206 on the clamp 200. The ball 304 is kept from movement, thereby keeping the clamp 200 from movement, by being housed between the first surface 406 of the screw 400 (FIG. 3) and the port 306. In the position shown, the clamp 200 releasably secures the disc stack 108 to the hub 106 by engaging the uppermost disc 102 with a disc clamping surface 202.

To remove the clamp 200 from the hub 106, the nut 300 is rotated to partially disengage the first threaded section 320 of the nut 300 from the second threaded section 420 until ports 306 are located adjacent to the second surface 404. Second surface 404 has a diameter less than the diameter of the first surface 406, which allows the balls 304 to be retracted from protruding from the ports 306. A cam surface 402 joins the first surface 406 and the second surface 404 to allow the balls 304 to transition smoothly between the position for engaging and the position for releasing the balls 304 with the axial catch 206. The disc stack 108 can be repeatably re-secured to the hub 106 by inserting the guide portion 204 of the clamp 200 into the opening 114 of the hub 106 and engaging the balls 304 with the axial catch 206 by advancing the nut 300 into the opening 114 of the hub 106 until the balls 304 rest on the first surface 406, thereby moving the balls 304 outwardly from the ports 306 to secure the clamp 200 to the disc stack assembly 108.

Typically, when in operation, the disc stack 108 is rotated in a counter-clockwise direction relative to viewing the disc stack assembly 108 from the clamp 200. In order to minimize the likelihood that the threaded sections come unscrewed during operation, it is preferable that all threaded sections use a left-handed thread. Clamping force of the clamp 200 on disc stack 108 is preferably between 110 and 160 pounds. With a clamping force of 160 pounds, threads are self-locking when the pitch is about 24 threads per inch, with a 5/16-inch diameter thread and 30 degree thread angle, when using steel-on-steel arrangement.

Figure 5:
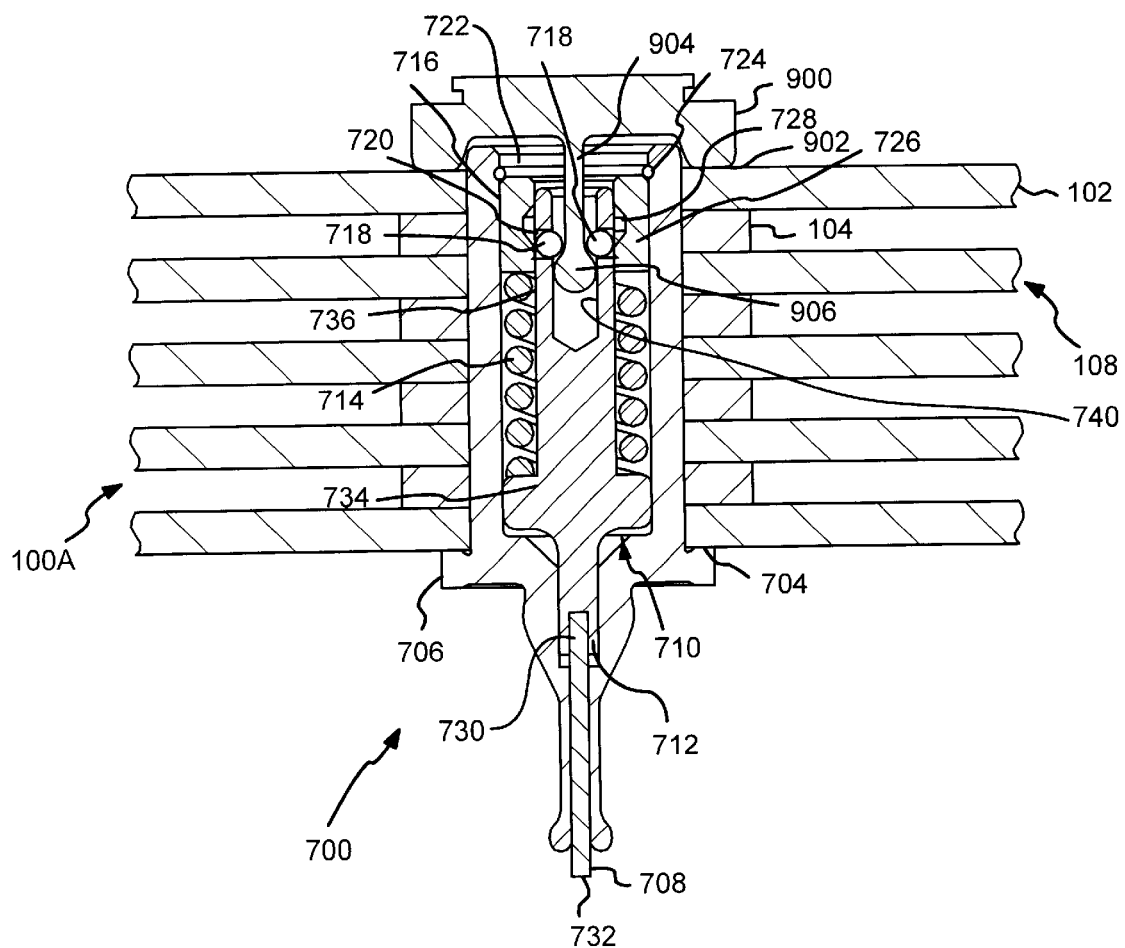
FIG. 5 is an axial cross-sectional view of a disc stack clamping assembly in accordance with preferred embodiments of the present invention.

Referring now to FIG. 5, shown is another example embodiment of a disc clamping assembly 100A of the present invention. The disc stack 108 including alternating discs 102 and spacers 104 is secured between the hub flange 704 and the disc clamping surface 902 of the disc clamp 900. The clamp 900 includes a depending member 904 having an axial catch 906 at the end of the depending member 904.

The hub assembly 700 includes a hub 706 and a retaining arrangement 710 to removably secure the clamp 900 in a position to secure the disc stack 108. The retaining arrangement 710 includes a pin 708, a plunger 712, a spring 714, a collar 716 and one or more radially moveable members, in this example, balls 718. The first end 730 of the pin 708 is coupled to the plunger 712 and the second end 732 of the pin 708 protrudes from the hub 706. The plunger 712 is disposed within the hub 706 and engages a first end 734 of the spring 714. A second end 736 of the spring 714 engages the collar 716 disposed within the hub 706. The collar 716 is located in the hub 706 near the opening 722 in the hub 706. The collar 716 is retained with the hub 706 by a retainer clip 724 secured in the hub 706 between the opening 722 of the hub 706 and the collar 716. The collar 716 includes a flange 726 and a recessed portion 728.

To secure the clamp 900 to the hub assembly 700, force is exerted on the pin 708, thereby moving the plunger 712 into a disengagement position (not shown). In the disengagement position, the ports 720 on the plunger 712 are aligned with the recessed portion 728 on the collar 716. The balls 718 are housed in the ports 720 and retained between the plunger 712 and the collar 716 when the retaining arrangement 710 is assembled into the hub 706. The ball 718 is retained in the port 720 by insuring the diameter of the ball 718 is greater than the diameter of the port 720 at an inner surface 740 of the plunger 712. In the disengagement position (not shown), the balls 718 can move outward within the ports 720 such that the axial catch 906 of the depending member 904 can be inserted into or removed from the plunger 712 past the balls 718.

After the depending member 904 is inserted into the retaining arrangement 710, the clamp 900 is removably secured to the hub assembly 700 by removing force from the pin 708, thereby allowing the spring 714 to return the plunger 712 to the engagement position (shown in FIG. 5). In the engagement position, the balls 718 are aligned with the flange 726 on the collar 716 and are forced to protrude from the ports 720 by the flange 726 on the collar 716 to thereby engage the axial catch 906.

Preferably, the ports 720 on the plunger 712 are spaced equidistantly for balancing the disc clamp assembly 100A during high-speed rotation. Preferably, the balls 718 are housed in alternating ports 720. For example, the plunger 712 containing six ports 720 spaced at sixty-degree intervals would preferably have the balls 718 spaced at one hundred twenty-degree intervals.

Alternatively characterized, a first embodiment of the present invention includes a disc clamping system (such as 100) for a disc stack array (such as 108) on a spindle hub (such as 106) that includes a disc clamp (such as 200) with an axial catch (such as 206) and a retaining arrangement (such as 350) for engaging the axial catch (such as 206). The retaining arrangement (such as 350) includes radially movable members (such as 304) that engage and secure the axial catch (such as 206) in an engagement position and disengage the axial catch (such as 206) in a disengagement position.

In another example embodiment, the retaining arrangement (such as 350) further includes a screw (such as 400) having a first threaded portion (such as 410) threadably secured into the interior of the spindle hub (such as 106), and a second threaded portion (such as 420). The screw (such as 400) further includes a first surface (such as 406), a second surface (such as 404), and a cam portion (such as 402) therebetween. A nut (such as 300) threadably engages the second threaded portion (such as 420) of the screw (such as 400) and the nut (such as 300) further includes a plurality of ports (such as 306) each having an outer opening, and at least two of the ports (such as 306) each house a ball (such as 304). The balls (such as 304) are housed between the first surface (such as 406) of the screw (such as 400) and the outer opening of the port (such as 306) within which each ball (such as 304) is housed when the clamp (such as 200) is in the engagement position and the balls (such as 304) are housed between the second surface (such as 404) of the screw (such as 400) and the outer opening of the port (such as 306) within which each ball (such as 304) is housed when the axial catch (such as 206) is in the disengagement position.

In another example embodiment, a releasable, rotatable disc positioning system includes a spindle hub (such as 106) and a disc stack (such as 108) on the spindle hub (such as 106). The disc stack (such as 108) includes at least one disc (such as 102). The disc positioning system further includes a disc clamp (such as 200) including an axial catch (such as 206) and a retaining arrangement (such as 350) for engaging the axial catch (such as 206), wherein the retaining arrangement (such as 350) includes a plurality of radially movable members (such as 304) that engage and secure the axial catch (such as 206) in an engagement position and disengage the axial catch (such as 206) in a disengagement position.

In another example embodiment, a disc clamp arrangement (such as 100) includes a disc clamp (such as 200) having an axial catch (such as 206) for securing an information storage disc such as 102 on a spindle hub such as 106 in a disc drive. The disc clamp arrangement (such as 100) further includes retaining means for removably securing the disc clamp to the spindle hub.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, radially moveable members may be one or more spring loaded-pins operating along a cam. Numerous other changes may be made which will readily suggest themselves to those skilled in the art and which are encompassed in the spirit of the invention disclosed and as defined in the appended claims.

What is claimed is:

1. A clamping system for clamping an object to a supporting surface with a clamping force that is directed along a clamping force axis, the clamping system comprising:
   a clamp moveable along the clamping force axis and comprising a catch defining an abutment surface that is noncoplanar with the clamping force axis; and
   a retaining assembly comprising a retaining member that is moveable in a first direction transverse to the clamping force axis to engage against the abutment surface, and is moveable in a second direction along the clamping force axis to impart the clamping force against the abutment surface in a clamped position of the clamping assembly.

2. The clamping system of claim 1 comprising an engagement member pressingly engaging against the retaining member and disposed along the clamping force axis, the engagement member comprising an extended surface and a recessed surface, wherein the extended surface engages the retaining member against the catch and the recessed surface clearingly disengages the retaining member from the catch.

3. The clamping system of claim 1 comprising a housing supporting the retaining member and moving the retaining member along the clamping force axis by a threading engagement between the housing and the engagement member.

4. The clamping system of claim 1 comprising a housing supporting the retaining member and moving the retaining member along the clamping force axis by a sliding engagement between the housing and the engagement member.

5. The clamping system of claim 1 comprising a housing defining a port, wherein the retaining member comprises a ball member disposed in the port.

6. The clamping system of claim 5 wherein the housing supports two or more retaining members equally spaced circumferentially around the housing.

7. A disc stack clamping assembly comprising:
   a hub adapted to support the disc stack having one or more discs;
   a disc clamp insertable axially in the hub, the disc clamp comprising a catch defining a nonaxial abutment surface; and
   a retaining assembly supported by the hub comprising a retaining member that is moveable radially to engage against the abutment surface and moveable axially to impart an axial force against the abutment surface in clamping the clamp against the disc stack.

8. The disc stack clamping assembly of claim 7 comprising an axially disposed engagement member pressingly engaging against the retaining member, the engagement member comprising an extended surface and a recessed surface, wherein the extended surface engages the retaining member against the catch and the recessed surface clearingly disengages the retaining member from the catch.

9. The disc stack clamping assembly of claim 7 comprising a housing supporting the retaining member and moving the retaining member axially by a threading engagement between the housing and the engagement member.

10. The disc stack clamping assembly of claim 7 comprising a housing supporting the retaining member and moving the retaining member axially by a sliding engagement between the housing and the engagement member.

11. The disc positioning system according to claim 7 wherein the radially moveable members move outwardly towards the spindle hub to enter the engagement position and move inwardly away from the spindle hub to enter the disengagement position.

12. The disc stack clamping assembly of claim 7 comprising a housing defining a port, wherein the retaining member comprises a ball member disposed in the port.

13. The disc stack clamping assembly of claim 12 wherein the housing supports two or more retaining members equally spaced circumferentially around the housing.

14. A disc clamp arrangement comprising:
    a disc clamp having an axial catch for securing an information storage disc on a spindle hub in a disc drive; and
    retaining means for removably securing the disc clamp with the spindle hub.

15. The disc clamp arrangement of claim 14 wherein the retaining means are disposed within an interior of the spindle hub.

16. The disc clamp arrangement of claim 14 wherein the retaining means comprises a plurality of balls engaging the axial catch to removably secure the disc clamp to the spindle hub.

17. The disc clamp arrangement of claim 14 wherein the retaining means comprises a plurality of circumferentially distributed ports each for housing a respective radially movable member.

18. The disc clamp arrangement of claim 17 wherein the ports are spaced at regular intervals around the spindle hub.

19. The disc clamp assembly of claim 14 wherein the retaining means includes radially moveable members move outwardly towards the spindle hub to enter an engagement position and move inwardly away from the spindle hub to enter the disengagement position.

20. The disc clamp arrangement of claim 14 wherein the retaining means comprises an axially disposed engagement member pressingly engaging against a retaining member, the engagement member comprising an extended surface and a recessed surface, wherein the extended surface engages the retaining member against the axial catch and the recessed surface clearingly disengages the retaining member from the axial catch.

21. The disc clamp arrangement of claim 20 comprising a housing supporting the retaining member and moving the retaining member axially in a pressing engagement against the axial catch by a threading engagement between the housing and the engagement member.

22. The disc clamp arrangement of claim 20 comprising a housing supporting the retaining member and moving the retaining member axially in a pressing engagement against the axial catch by a sliding engagement between the housing and the engagement member.

* * * * *